March 17, 1953  P. W. ROMINE ET AL  2,631,480
HYDRAULIC STEP DRILLING UNIT
Filed March 5, 1951

INVENTORS.
Paul W. Romine,
Andrew Armstrong.
BY
Jay C Taylor
ATTORNEY.

Patented Mar. 17, 1953

2,631,480

UNITED STATES PATENT OFFICE 2,631,480

HYDRAULIC STEP DRILLING UNIT

Paul W. Romine and Andrew Armstrong, St. Clair Shores, Mich., assignors of one-third to Charles Leitschuh Application March 5, 1951, Serial No. 213,972

15 Claims. (Cl. 77—32.3)

This invention relates to a pressure controlled, hydraulically actuated step feed mechanism for deep hole machine drilling.

In certain machine drilling operations, as for example in the fabrication of automobile crankshafts where the hole drilled is comparatively deep with respect to its diameter, it is necessary to carry out the drilling operation in a series of drilling steps of progressively increasing depth. After each step, the drill is withdrawn from the hole both to cool the drill and to clear the hole from shavings.

An important object of the present invention is to provide an improved hydraulically actuated control mechanism cooperable with a machine drill and automatically operative to advance the latter rapidly toward the workpiece, then to retard the rate of advance of the drill just before it engages the workpiece and to advance the drill at the retarded rate in a drilling step until the hole is drilled to a predetermined depth approximately equal to its diameter, then to withdraw the drill rapidly from the hole to clear the same from shavings and to permit access of cooling fluid to the drill tip, then to repeat the foregoing cycle automatically until the desired final depth of the hole is achieved, whereupon the drill is rapidly withdrawn finally from the hole and the automatic cycle terminated. The second and each succeeding rapid advance of the drill during the automatic cycle continues until the drill approaches to within a fraction of an inch of the bottom of the hole drilled in the prior step. The length of each drilling step at retarded rate of advance is substantially the same as the initial drilling step.

Another and more specific object is to provide a mechanism of the foregoing nature comprising a hydraulically operated driving piston within a cylinder and a hydraulic dashpot or driven piston within a cylinder and adapted to be operatively engaged and driven by the driving piston when the latter has proceeded in a rapid advance stroke for a predetermined adjustable distance. Hydraulic fluid in advance of the dashpot or driven piston is discharged through a restricted high resistance metering valve which retards the rate of advance of the driving piston. The latter is also operatively engaged with the drill carriage to move the same toward or from a workpiece to be drilled upon corresponding advance or withdrawal of the driving piston. The relationship of the pistons and drill carriage is thus determined so that the drill carriage is advanced rapidly toward the workpiece until just before the drill spindle engages the workpiece. The driving piston then comes into driving engagement with the driven or dashpot piston and the rate of advance of the driving piston and carriage and drill moving therewith is retarded in accordance with the adjustment of the metering valve.

Hydraulic fluid discharged from the dashpot cylinder through the metering valve is conducted into an adjustable volume accumulator in hydraulic communication with a pressure switch in an electromagnetic circuit. When a predetermined pressure develops in the accumulator to actuate the pressure switch, the electromagnetic circuit is effective to reverse the direction of movement of the driving piston, so as to withdraw the latter from the driven piston, and simultaneously open the pressure accumulator to a sump or drain. Upon withdrawal of the driving piston from the driven piston, the latter will remain substantially in position to be engaged again by the driving piston upon a repetition of the above cycle.

The drill spindle movable linearly with the driving piston is adjusted so as to be withdrawn conveniently from the workpiece when the driving piston is at its limit of withdrawal movement. The amount of rapid advance movement of the driving piston prior to its driving engagement with the driven piston is adjusted so that the driving engagement will occur immediately before the drill engages the workpiece. Accordingly the drill will not be jammed at high speed into the workpiece, but will move into the latter at the retarded speed determined by the dashpot action of fluid discharging in advance of the driven piston through the metering valve. The latter is also suitably adjusted to achieve the desired rate of drill feed during the drilling operation. Also the adjustable accumulator is adjusted so that when the dashpot or driven piston has advanced a predetermined distance approximately equal to the diameter of the hole being drilled, the volume of hydraulic fluid received by the accumulator from the dashpot cylinder will develop sufficient pressure in the accumulator to actuate the pressure switch.

Another object of the present invention is to provide a step feed control apparatus of the foregoing nature including simple means for assuring a slight rebound or withdrawal movement of the driven or dashpot piston after each drilling step, the driven piston thereafter remaining in position as aforesaid to be engaged by the driving piston on the next succeeding rapid advance stroke. The rebound is accomplished by introducing through a restricted orifice a small volume of hydraulic fluid into the dashpot cylinder in advance of the driven or dashpot piston during the withdrawal movement of the driving piston. Thus, upon the next succeeding rapid advance stroke of the driving piston, the latter will engage the driven or dashpot piston slightly before the drill engages the workpiece, as determined by the extent of the rebound. Accordingly the rapid advance movement of the drill toward the workpiece will be cushioned and retarded before the drill strikes the workpiece.

Still another object of the present invention is to provide an automatic step feed drill control apparatus of the foregoing nature, which is operative in response to the quantity of hydraulic fluid discharged from the dashpot cylinder to determine the depth of the drilling stroke at retarded speed, and which is readily amendable to adjustment of the lengths of both the rapid advance stroke and slower drilling stroke, as well as the speed of the drilling stroke and the position of the drill with respect to the workpiece at various stages of the drilling operation.

Other objects of this invention will appear in the following description and appended claims, reference being had to the accompanying drawing forming a part of this specification wherein like reference characters designate corresponding parts in the several views.

Figure 1:
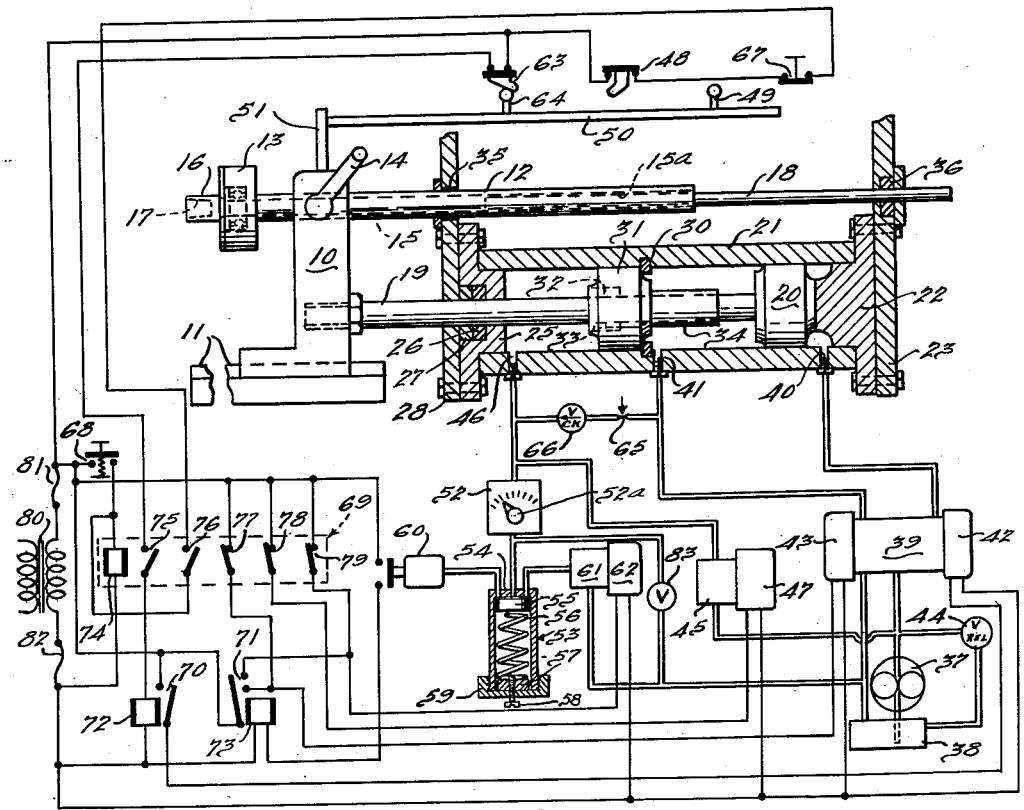
Fig. 1 is a semi-schematic fragmentary view showing an embodiment of the hydraulic step feed drill control apparatus employing the present invention, with the electrical and hydraulic circuits schematically superimposed thereon.

It is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation.

Referring to the drawing, one embodiment of the present invention is illustrated by way of example comprising a sliding carriage 10 mounted to ride or slide along a guideway 11 toward or from a workpiece to be drilled (not shown). Extending through the upper portion of the carriage 10 parallel to the guideway 11 is a non-rotatable tubular shaft housing 12 having a thrust bearing housing 13 at its forward end and being suitably clamped in adjusted position to the carriage 10 for movement therewith by a screw type clamping lever 14. Rotatable coaxially within the housing 12 is a shaft 15 having its forward portion journaled within the bearing housing 13 and terminating in an enlarged integral head 16 projected forward of the housing 13 and provided with a forward opening tool holding socket 17. The latter is adapted to receive the shank of a drill securely therein so as to rotate and move the latter axially toward or from the workpiece upon corresponding movement of the carriage 10 along the guideway 11. The rearward portion of the shaft 15 is provided with a coaxial rearward opening bore 15a within which is splined the forward end of a rotatable drive shaft 18, suitably rotated by means not shown, whereby the shaft 15 is movable axially in telescoping relation with respect to the drive shaft 18 and at the same time rotated therewith. The structure described thus far may be conventional if desired and is accordingly not discussed in detail.

Linear movement of the carirage 10 along the way 11 is effected by a plunger 19 suitably secured at its forward end to the carriage 10. From the carriage 10, the plunger 19 extends rearward parallel to the way 11 and is rigidly secured at its rearward end to a hydraulically actuated driving piston 20 movable within a fixed cylinder 21. The latter is closed at its rearward end by an end plate 22 suitably secured to a fixed support 23 and is closed at its forward end by an apertured end plate 25 through which the plunger 19 is slidable upon actuation of the piston 20. The plate 25 is provided with the usual oil seal 26 and packing gland 27 and is also suitably secured to a fixed forward support 28. Intermediate the end plates 22 and 25 and recessed into the inner wall of the cylinder 21 is a stop 30 which may comprise a split ring if desired and which for the sake of discussion may be said to divide the cylinder 21 into a rearward driving cylinder portion for the driving piston 20 and a forward dashpot cylinder portion for a hydraulically actuated dashpot or driven piston 31. The latter is freely slidable on the plunger 19 forward of the stop 30 and is provided with an oil seal 32 and packing gland 33 to prevent leakage of hydraulic fluid from front to rear, i. e. from left to right, past the dashpot piston 31.

Figure 2:
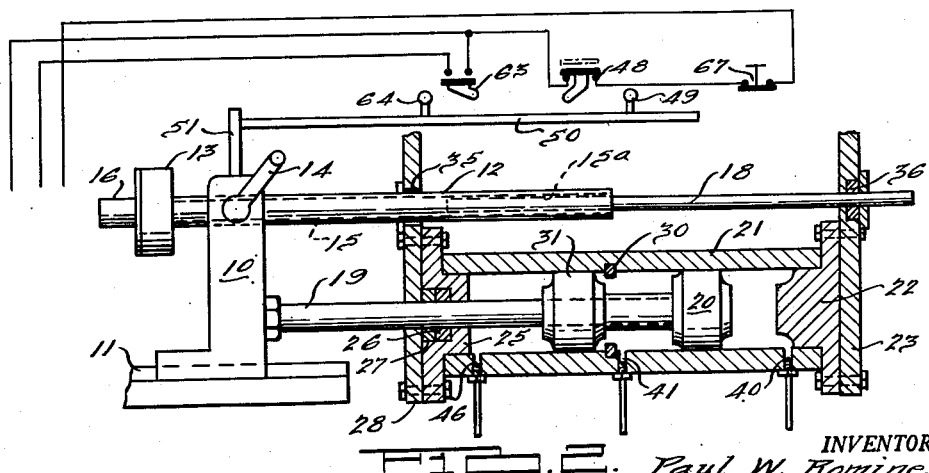
Fig. 2 is a fragmentary view similar to Fig. 1, but showing the hydraulic apparatus in position as at the end of forward movement after the first drilling operation or step.

Replaceably mounted on the plunger 19 and freely slidable thereon between the pistons 20 and 31 is a spacer 34, by which the dashpot piston 31 is driven forward upon forward movement of the driving piston 20 after the latter moves into engagement with the rearward end of the spacer 34, Fig. 2. In order to permit adjustment of the minimum spacing between the pistons 20 and 31, the spacer 34 is preferably replaceable on the plunger 19 by a similar spacer of different size upon disassembling the piston and cylinder assembly. Also in the present instance, the housing 12 extends slidably through a flanged bushing 35 secured within the forward support 28. The rotatable drive shaft 18 is supported and journaled within a bearing 36 carried by the rearward support 23.

Hydraulic actuation of the mechanism is accomplished by a hydraulic system including a pump 37 connected with a sump or reservoir 38 for hydraulic fluid and operative to deliver the fluid under pressure to a four-way two-position valve 39. The latter has a return connection to the sump 38 and also connections with ports 40 and 41 located in the sidewall of the cylinder 21 rearward of the piston 20 and in advance thereof respectively. The valve 39 is operated by two solenoids 42 and 43 and is shiftable to a rapid advance position, whereat the port 40 is connected to the pump 37 and the port 41 is connected to the sump 38, upon energizing the solenoid 42 when the solenoid 43 is deenergized. Upon energizing the solenoid 43 when the solenoid 42 is deenergized, the valve 39 is shifted to a rapid return position, whereat the port 41 is connected to the pump 37 and the port 40 is connected to the sump 38.

The pressure side of the pump 37 is also connected to the sump 38 through an adjustable pressure relief valve 44 in order to prevent hydraulic pressure in the system from rising above a predetermined maximum, and is connected through a normally closed resetting valve 45 to a port 46 located in the sidewall of the cylinder 21 in advance of the piston 31. The valve 45 is opened or closed upon energizing or deenergizing the solenoid 47, which in turn is energized in response to opening of a normally closed limit switch 48 as discussed below, by contact with a dog 49. The latter is adjustable along a slide rod 50 and suitably secured thereon in adjusted position so as to open the limit switch 48 when the carriage 10 has moved to a predetermined foremost position, as for example upon completion of a drilling process on the workpiece. The rod 50 extends parallel to the way 11 and is secured to the carriage 10 for movement therewith by means of a bracket 51.

In order to effect dashpot action of the piston 31, the port 46 is also connected through an adjustable metering and check valve 52 to an adjustable accumulator 53. The former is provided with a high resistance or restricted orifice and is adapted to permit unidirectional flow of hydraulic fluid into the accumulator 53 at a slow rate, whereby discharge of fluid from the port 46 and accordingly the advance of the piston 31 are retarded. Preferably, the rate of flow through the metering valve is readily variable, as by turning an adjustment screw 52a, whereby the rate of advance of the cylinder 31 is varied in accordance with the desired drilling rate, as discussed below.

The accumulator 53 comprises a cylindrical chamber closed at one end by a capping plate 54, except for the hydraulic connections thereto, and contains an axially movable piston 55 which in effect comprises an adjustable closure or bottom for the other end of the accumulator chamber. The piston 55 is yieldingly urged toward the end plate 54 by means of a coil spring 56 disposed under tension between the piston 55 and a spring retainer 57. An adjusting screw 58 accessible from the exterior of the base plate 59 screws upward therethrough and into the accumulator cylinder so as to adjustably block or limit downward movement of piston 55.

The accumulator chamber is also connected with a normally open pressure switch 60, and to the sump 38 through a normally closed accumulator resetting valve 61. The latter is opened or closed respectively upon energizing or deenergizing a solenoid 62 in accordance with closing or opening respectively of the pressure switch 60. The latter is set to close an electronic circuit when the pressure in the accumulator reaches a predetermined value, and to return to open position, after once being closed, when the pressure in the accumulator returns to zero, i. e. atmospheric pressure.

In accordance with the foregoing, as the dashpot piston 31 advances, hydraulic fluid filling the accumulator chamber will depress the piston 55 against the spring 56. When the piston 55 engages the screw 58, pressure in the accumulator will suddenly reach a value sufficient to actuate and close the pressure switch 60. Accordingly by suitably adjusting the screw 58, the volume of fluid required to be discharged into the accumulator 53 to actuate and close the pressure switch 60 may be predetermined. The position of the screw 58 may thus be calibrated in terms of forward displacement or movement of the piston 31 if desired.

In operation of the structure described, the apparatus is set for the drilling operation by moving the pistons 20 and 31 to their rearmost positions, Fig. 1, and by adjusting the shaft housing 12 with respect to the carriage 10, so that a drill carried in the socket 17 is conveniently withdrawn from the workpiece a distance slightly greater than the spacing between the piston 20 and spacer 34. Setting of the apparatus is accomplished by selecting a spacer 34 of suitable length and finally by loosening the clamping action of the clamping lever 14 to permit sliding adjustment of the shaft housing 12 with respect to the carriage 10, whereupon the lever 14 is tightened again to secure the housing 12 and carriage 10 together for movement as a unit.

While valves 45 and 61 are closed, valve 39 is shifted to rapid advance position by energizing solenoid 42 while solenoid 43 is deenergized. Hydraulic fluid is then pumped into port 40 and discharged through port 41 to the sump 38, causing piston 20 to advance rapidly toward the spacer 34 and simultaneously moving the plunger 19 and carriage 10 toward the workpiece. Immediately before the drill carried in the socket 17 engages the workpiece, the piston 20 engages the spacer 34 in driving engagement with the dashpot piston 31, Fig. 2. Hydraulic fluid in advance of the piston 31 is discharged through the port 46 and thence through the high resistance metering valve 52 and into the accumulator 53 as discussed above.

By virtue of the small orifice of the metering valve 52, the rate of advance of the piston 20 is immediately retarded by engagement with the spacer 34, causing the drill to ease into the workpiece and to continue at the retarded speed determined by the adjustment of the metering valve 52 for the balance of the drilling step.

When the forward movement of the driven piston 31 has proceeded a predetermined distance determined by the setting of the adjustment screw 51, continued downward movement of the piston 55 will be blocked by the screw 58, the pressure in accumulator 53 will suddenly rise, and the pressure switch 60 will be actuated to close an electromagnetic circuit discussed below. As a result, valve 61 is opened to release fluid from the accumulator 53 into the sump 38 and to permit the accumulator to reset itself by action of the spring 56, urging the piston 55 against the end plate 54. Also as a result of closing pressure switch 60, solenoid 43 is energized while solenoid 42 is deenergized, causing valve 39 to shift to the rapid return position. Hydraulic fluid is then pumped under pressure through port 41 and discharged from port 40 to the sump 38 to move the piston 20 and plunger 19 rapidly to the right and thereby to cause rapid withdrawal of the drill from the workpiece. During the withdrawal movement, the plunger 19 slides through the dashpot or driven piston 31, leaving the latter substantially unmoved, except for a slight rebound of approximately one sixty-fourth of an inch as discussed below, in position to be engaged and driven forward by the next successive advance of the plunger 20 against the spacer 34.

At the limit of withdrawal movement of the piston 20 to the right, a normally open limit switch 63 is closed by engagement with a dog 64 adjustably mounted on the shaft 50, activating the electromagnetic circuit to cause a repetition of the above outlined cycle. However, by virtue of the advanced position of the dashpot piston 31, the next rapid advance stroke will continue until the drill is projected almost to the bottom of the hole drilled during the preceding step. The piston 20 then moves into driving engagement with the spacer 34 and piston 31, whereby the rate of advance is retarded and the drill is eased into the workpiece for the next drilling step.

In order to prevent the drill from being jammed into the workpiece at the end of each rapid advance stroke, the port 46 is connected to the port 41 and rapid return side of the valve 39 through a high resistance orifice 65 of small diameter and a check valve 66 in series which permit a slow unidirectional flow of fluid into port 46 during the rapid withdrawal or return movement of the piston 20. Thus throughout the rearward movement of the piston 20 when hydraulic fluid is delivered under pressure through the port 41, a very small rearward movement of the piston 31 also occurs as a result of a slight flow of the pressurized fluid through the restricted orifice 65 and port 46. The total desired rearward movement of piston 31 will seldom exceed approximately one sixty-fourth of an inch and is just sufficient to achieve a cushion effect to brake the rapid advance of the piston 20 prior to engagement between the drill and the bottom of the hole drilled during the preceding step. Of course a slight rebound of the piston 31 will occur as a result of compressed fluid ahead thereof upon withdrawal of piston 20. However, under normally low operating pressures, the extent of rebound afforded by comparatively incompressible hydraulic fluid is unsatisfactory. The present invention employing the resistance orifice 65 assures a positive and adequate rebound at low operating pressures and is particularly useful with small diameter drills.

The electromagnetic control circuit for the various solenoids includes in addition to the pressure switch 60 and limit switches 48 and 63, a normally closed emergency return switch 67, a spring returned, normally open cycle start switch 68, a multiple contactor relay switch indicated generally by the numeral 69, and normally open relay switches 70 and 71 actuated by electromagnets 72 and 73 respectively. The multiple contactor switch 69 comprises five switches under the influence of a single electromagnet 74, including normally open switches 75 and 76 and normally closed switches 77, 78 and 79, all enclosed within a dotted rectangle to indicate operation in unison. The circuit is energized in the present instance through a transformer 80 having fuses 81 and 82 on either side of its secondary coil and in series with the remainder of the circuit.

Assuming that the pump 37 is operating and that the cycle start switch 68 is open, electric power from transformer 80 will flow through the normally closed relay switches 77, 78 and 79 and energize solenoids 43, 47 and 62. Energized solenoids 43 will shift valve 39 to the rapid return position, driving piston 20 to the right by virtue of hydraulic fluid being pumped through port 41 and discharged to the sump 38 through port 40. At the limit of movement to the right, dog 64 moving with the carriage 10 closes the normally open limit switch 63. Energize solenoid 47 will hold the normally closed resetting valve 45 open, so that pressurized fluid will also be delivered through port 46 to drive piston 31 to the limit of its movement against the stop 30. Energized solenoid 62 will hold the normally closed valve 61 open, connecting the accumulator 53 to the sump 38.

It is realized that once piston 20 reaches its limit of movement to the right, piston 31 will merely "float" with equal pressure on both sides thereof. However, as will be apparent from the following, piston 31 always has a shorter distance of travel to its limit of movement to the right than has piston 20. Accordingly piston 31 will reach its position adjacent the stop 30 before piston 20 reaches the end plate 22. The final position of the pistons 20 and 31 will be as indicated in Fig. 1.

The above described cycle of operations is started by momentarily closing cycle start switch 68, which closes a circuit through electromagnet 74 and thereby closes relay switches 75 and 76 and opens switches 77, 78 and 79. Opening switches 78 and 79 deenergize solenoids 47 and 62, permitting the respective resetting valves 45 and 61 to close. Opening switch 77 deenergizes solenoid 43. Closing switch 75 while limit switch 63 is closed energizes electromagnet 72, which closes relay switch 70 to energize solenoid 42. Inasmuch as solenoid 43 is now deenergized by reason of open switch 77, valve 39 is shifted to the rapid advance position, whereat hydraulic fluid is pumped through port 40 and is returned to the sump 38 through port 41. Piston 20 is thus rapidly advanced toward the spacer 34. During this movement, plunger 19 slides through piston 31, which remains stationary, and moves the carriage rapidly toward the workpiece. Likewise during this movement, dog 64 rides off limit switch 63, Fig. 2, which returns to open position and deenergizes electromagnet 72. Normally open relay switch 70 then opens, deenergizing solenoid 42. Valve 39 remains unchanged at the rapid advance position, since solenoid 43 is also deenergized, and the rapid advance stroke continues. Normally open relay switch 76, now closed, completes a holding circuit through the normally closed limit switch 48 and emergency return switch 67, whereby the cycle start switch 68 may be released to open position without deenergizing electromagnet 74.

Upon continued rapid advance of plunger 20 to the left, it will strike spacer 34 as discussed above and drive piston 31 at a retarded rate, since port 46 must now discharge through the high resistance metering valve 52 into the accumulator 53. Accordingly the drill, which is assumed to be rotating, is eased into the workpiece for the first step in the drilling operation.

Finally when the hydraulic fluid discharged through port 46 ahead of the advancing dashpot piston 31 into the accumulator 53 has moved piston 55 downward into engagement with the screw 58, sufficient pressure develope in the accumulator 53 to activate and close pressure switch 60. Electromagnet 73 is then energized and normally open relay switch 71 is closed. As a result, solenoids 62 and 43 are again energized, opening valve 61 and causing valve 39 to shift to rapid return position, since solenoid 42 is now deenergized as aforesaid. Upon opening valve 61, the accumulator spring 56 resets the accumulator piston 55 and the pressure switch 60 reopens when the pressure in the accumulator drops to atmospheric pressure. Opening switch 60 deenergizes electromagnet 73 and normally open switch 71 reopens, deenergizing solenoids 62 and 43. Normally closed valve 61 then closes, but valve 39 remains unchanged at the rapid return position, since solenoid 42 is also deenergized.

Meanwhile, upon shifting valve 39 to rapid return position, hydraulic fluid enters port 41 directly and slowly enters port 46 through the constriction 65 and check valve 66. Hydraulic fluid is also discharged to the sump 38 through port 40, so that piston 20 and plunger 19 rapidly move to the right, whereas piston 31 slowly moves to the right to effect the slight rebound action as discussed above.

Upon return movement of the piston 20 and plunger 19 to the limits of movement at the right, dog 64 on shaft 50 closes the normally open limit switch 63, whereby electromagnet 72 is again energized through the normally open but now closed relay switch 75. Switch 70 then closes, energizing solenoid 42 and shifting valve 39 to the rapid advance position. The cycle will thus repeat itself indefinitely until the drilling operation has proceeded to a predetermined depth, whereat dog 49 engages and opens normally closed limit switch 48, phantom position, Fig. 2, to break the holding circuit through normally open but now closed relay switch 76 and de-energize electromagnet 74. As a result, switches 75 and 76 reopen and switches 77, 78 and 79 close, as at the beginning of the operation prior to closing of the cycle start switch 68. The solenoid operated valves 61 and 45 open and valve 39 is shifted to rapid return position. The accumulator thus resets itself and hydraulic fluid is pumped into ports 41 and 46 and discharged to the sump 38 through port 40. Piston 31, being unencumbered by the plunger 19 and carriage 10, moves to the right in driving engagement with piston 20. At the limit of movement of piston 31 to the right, piston 20 leaves the spacer 34 and continues to its limit of movement.

It is also to be noted that the holding circuit switch 76 can be broken at any phase of the cycle by opening the normally closed emergency return switch 67, which then causes resetting of the mechanism at the condition of Fig. 1 similarly to the action resulting from opening limit switch 48.

In order to permit the mechanism to be readily adapted for use in a customary non-step drilling operation, the hydraulic connection between the metering valve 52 and accumulator 53 is connected through a normally closed valve 83 to the sump 38. Upon opening valve 83, the accumulator 53 as well as pressure switch 60 and solenoid switch 61 are effectively eliminated from the hydraulic and electrical circuits. In that case, hydraulic fluid from the metering valve 52 will flow directly to the sump 38, rather than into the spring loaded accumulator 53. Accordingly, pressure switch 60 will never close and solenoid 62 will never be energized to open valve 61.

Thus when the apparatus is adjusted and set as indicated in Fig. 1 and as discussed above, but with valve 83 open, and cycle start switch 68 is closed, piston 20 will be driven rapidly leftward in the manner aforesaid. Plunger 19 and carriage 10 will likewise be moved rapidly leftward, advancing the drill toward the workpiece. By properly adjusting the apparatus, piston 20 will engage spacer 34 immediately before the drill strikes the workpiece. The rate of leftward advance will then be retarded by reason of hydraulic fluid discharging ahead of piston 31 through port 46 and thence through the metering valve 52 into the sump 38. The drill will accordingly ease into the workpiece at the retarded rate and continue leftward movement in a drilling operation at the retarded rate until upon completion of the operation, dog 49 opens limit switch 48 to cause rapid return movement of pistons 20 and 31 and the carriage 10, i. e. to the right, as discussed above.

We claim:

1. In a step feeding apparatus for a machine tool holder, means for advancing or retracting the holder in successive feeding steps including a fluid actuated driving piston movable in a cylinder and operatively connected with the holder, means to retard the rate of advance movement of the driving piston at successively advanced positions during successive feeding steps including a dashpot having the dashpot piston thereof operatively engageable with the driving piston to be driven forward thereby upon predetermined advance movement of the driving piston during each feeding step, an accumulator connected with the dashpot to receive the fluid discharged therefrom upon advance movement thereof and comprising a cylinder having an accumulator piston movable in one direction by said fluid, means for adjustably resisting movement of said accumulator piston in the direction opposite said first named directions and control means for the fluid actuated driving piston responsive to the pressure in the accumulator to effect retraction movement of the driving piston.

2. In a step feeding apparatus for a machine tool holder, means for advancing or retracting the holder in successive feeding steps including a fluid actuated driving piston movable in a cylinder and operatively connected with the holder, means to retard the rate of advance movement of the driving piston at successively advanced positions during successive feeding steps including a dashpot having the dashpot piston thereof operatively engageable with the driving piston to be driven forward thereby upon predetermined advance movement of the driving piston during each feeding step, an accumulator connected with the dashpot to receive the fluid discharged therefrom upon advance movement of the dashpot piston, and control means for the fluid actuated driving piston responsive to the volume of fluid received by the accumulator to effect retraction of the driving piston.

3. In a step feeding apparatus for a machine tool holder, means for advancing or retracting the holder in successive feeding steps including a fluid actuated driving piston movable in a cylinder and operatively connected with the holder, means to retard the rate of advance movement of the driving piston at successively advanced positions during successive feeding steps including a dashpot having the dashpot piston thereof operatively engageable with the driving piston to be driven forward thereby upon predetermined advance movement of the driving piston during each feeding step, and control means for the fluid actuated driving piston responsive to a predetermined forward displacement of the dashpot piston to effect retraction of the driving piston.

4. In a step feeding apparatus for a machine tool holder, fluid actuated means operatively engaged with the holder to advance or retract the same, means to retard the rate of advance at successively advanced positions of the holder in successive feeding steps including dashpot means having the movable element thereof operatively engageable with the fluid actuated means to be driven forward thereby upon predetermined advance movement of the latter during each feeding step, and control means for the fluid actuated means responsive to a predetermined pressure in advance of said dashpot movable element to effect retraction of the holder.

5. In a step feeding apparatus for a machine tool holder, fluid actuated means operatively engaged with the holder to advance or retract the same, means to retard the rate of advance at successively advanced positions of the holder in successive feeding steps including dashpot means having the movable element thereof operatively engageable with the fluid actuated means to be driven forward thereby upon predetermined advance movement of the latter during each feeding step, accumulator means in communication with the dashpot means to receive the fluid discharged therefrom during said forward movement, and control means for the fluid actuated means responsive to a predetermined pressure in said accumulator means to effect retraction of the holder.

6. In a step feeding apparatus for a machine tool holder, an operative hydraulic system including hydraulically actuated means operatively engaged with the holder to advance or retract the same, means to retard the rate of advance at successively advanced positions of the holder in successive feeding steps including dashpot means having the movable element thereof operatively engageable with the hydraulically actuated means to be driven forward thereby upon predetermined advance movement of the latter during each feeding step, means in said system operative to introduce a small quantity of fluid into the dashpot means in advance of the latter's movable element to retract the same slightly during retraction movement of the hydraulically actuated means, and control means for the hydraulically actuated means responsive to a predetermined advance of said dashpot movable element to effect retraction of the holder.

7. In a step feeding apparatus for a machine tool holder, an operative hydraulic system including hydraulically actuated means operatively engaged with the holder to advance or retract the same, means to retard the rate of advance at successively advanced positions of the holder in successive feeding steps including dashpot means having the movable element thereof operatively engageable with the hydraulically actuated means to be driven forward thereby upon predetermined advance movement of the latter during each feeding step, accumulator means in said system and hydraulically connected with the dashpot means to receive fluid discharged therefrom during said advance movement, means in said system operative to introduce a small volume of fluid into the dashpot means in advance of the latter's movable element to retract the same slightly during retraction movement of the hydraulically actuated means, and control means for the system responsive to the discharge of a predetermined quantity of fluid into the accumulator means to effect discharge of the latter and retraction of said hydraulically actuated means.

8. In a step feeding apparatus for a machine tool holder, means for advancing or retracting the holder in successive feeding steps including a hydraulically actuated driving piston movable in a cylinder and operatively connected with the holder, means to retard the rate of advance movement of the driving piston at successively advanced positions during successive feeding steps including a dashpot having the dashpot piston thereof operatively engageable with the driving piston to be driven forward thereby upon predetermined advance movement of the driving piston during each feeding step, a hydraulic circuit operatively connected with said dashpot and cylinder for the driving piston, and control means for the hydraulic circuit responsive to a predetermined forward displacement of the dashpot piston to actuate the hydraulic circuit to retract the driving piston and to effect a slight retraction of the dashpot piston.

9. In a step feeding apparatus for a machine tool holder, fluid actuated means operatively engaged with the holder to advance or retract the same, means to retard the rate of advance at successively advanced positions of the holder in successive feeding steps including dashpot means having the movable element thereof operatively engageable with the fluid actuated means to be driven forward thereby upon predetermined advance movement of the latter during each feeding step, and control means for the fluid actuated means responsive to the discharge of a predetermined quantity of fluid from in advance of said dashpot movable element to effect retraction of the holder.

10. In a step feeding apparatus for a machine tool holder, means for advancing and retracting the holder in successive feeding steps including a hydraulically actuated driving piston movable in a cylinder and operatively connected with the holder, means to retard the rate of advancement of the driving piston at successively advanced positions during successive feeding steps including a dashpot piston movable in a dashpot cylinder, means operatively connecting said pistons for advancing the dashpot piston after predetermined advancement of the driving piston during each feeding step, an adjustable accumulator connected with the dashpot cylinder to receive fluid discharged therefrom upon advancement of the dashpot piston, a hydraulic system operatively connected with said cylinders and accumulator, and means cooperative with the hydraulic system to effect retraction of the driving piston and discharge of the accumulator, including means operative in response to a predetermined quantity of fluid discharged into the accumulator.

11. In a step feeding apparatus for a machine tool holder, means for advancing and retracting the holder in successive feeding steps including a hydraulically actuated driving piston movable in a cylinder and operatively connected with the holder, means to retard the rate of advancement of the driving piston at successively advanced positions during successive feeding steps including a dashpot piston movable in a dashpot cylinder, means operatively connecting said pistons for advancing the dashpot piston after predetermined advancement of the driving piston during each feeding step, an adjustable accumulator connected with the dashpot cylinder to receive fluid discharged therefrom upon advancement of the dashpot piston, a hydraulic system operatively connected with said cylinders and accumulator, means cooperative with the hydraulic system to effect retraction of the driving piston and discharge of the accumulator, including means operative in response to a predetermined quantity of fluid discharged into the accumulator, and means operative in response to retraction of the driving piston to a predetermined position to effect the next advance of the driving piston.

12. In a step feeding apparatus for a machine tool holder, means for advancing and retracting the holder in successive feeding steps including a hydraulically actuated driving piston movable in a cylinder and operatively connected with the holder, means to retard the rate of advancement of the driving piston at successively advanced positions during successive feeding steps including a dashpot piston movable in a dashpot cylinder, means operatively connecting said pistons for advancing the dashpot piston after predetermined advancement of the driving piston during each feeding step, an adjustable accumulator connected with the dashpot cylinder to receive fluid discharged therefrom upon advancement of the dashpot piston, adjustable means to regulate the rate of fluid discharge from the dashpot cylinder to the accumulator, a hydraulic system operatively connected with said cylinders and accumulator, means cooperative with the hydraulic system to effect retraction of the driving piston and discharge of the accumulator, including means operative in response to a predetermined quantity of fluid discharged into the accumulator, and means operative in response to retraction of the driving piston to a predetermined position to effect the next advance of the driving piston.

13. In a step feeding apparatus for a machine tool holder, means for advancing and retracting the holder in successive feeding steps including a hydraulically actuated driving piston movable in a cylinder and operatively connected with the holder, means to retard the rate of advancement of the driving piston at successively advanced positions during successive feeding steps including a dashpot piston movable in a dashpot cylinder, means operatively connecting said pistons for advancing the dashpot piston after predetermined advancement of the driving piston during each feeding step, an accumulator connected with the dashpot cylinder to receive fluid discharged therefrom upon advancement of the dashpot piston comprising a cylinder having an accumulator piston movable in one direction by said fluid, means for adjustably resisting movement of said accumulator piston in the direction opposite said first named direction, a hydraulic system operatively connected with said cylinders and accumulator, and control means for said system operative in response to a predetermined quantity of fluid discharged into said accumulator to actuate the hydraulic system to effect retraction of the driving piston and discharge of the accumulator.

14. In a step feeding apparatus for a machine tool holder, a hydraulic system for advancing and retracting the holder in successive feeding steps including a hydraulically actuated driving piston movable in a cylinder and operatively connected with the holder, means to retard the rate of advance of the driving piston at successively advanced positions in successive feeding steps including a dashpot piston movable in a dashpot cylinder, an adjustable spacer movable into forward driving engagement with the dashpot piston, a portion movable with the driving piston and engageable with the spacer to move the latter into said driving engagement with the dashpot piston after predetermined advancement of the driving piston during each feeding step, an accumulator in said system hydraulically connected with the dashpot cylinder to receive fluid discharged therefrom upon forward movement of the dashpot piston, means in said system operative to introduce hydraulic fluid at a predetermined slow rate into said dashpot cylinder to cause a slight retraction of the dashpot piston during retraction of the driving piston, and a control for said system responsive to a predetermined quantity of fluid discharged into said accumulator to effect operation of said last named means and retraction of the driving piston and also to effect discharge of fluid from the accumulator received during the preceding advance of the dashpot piston.

15. In a step feeding apparatus for a machine tool holder, means for advancing and retracting the holder in successive feeding steps including a hydraulically actuated driving piston movable in a cylinder and operatively connected with the holder, means to retard the rate of advancement of the driving piston at successively advanced positions during successive feeding steps including a dashpot piston movable in a dashpot cylinder, means operatively connecting said pistons for advancing the dashpot piston after predetermined advancement of the driving piston during each feeding step, an adjustable metering valve in the fluid outlet of the dashpot cylinder to regulate the rate of fluid discharge from the latter, a hydraulic system operatively connected with said cylinders for actuation of the driving piston, said system including a source of pressurized fluid, high resistance means connecting said source with the dashpot cylinder to introduce fluid thereinto in advance of the dashpot piston, valve means in said system to stop the flow of fluid into said dashpot cylinder through said high resistance means during advance of the driving piston, control means for said system operative in response to a predetermined forward displacement of the dashpot piston to actuate said system to effect retraction of the driving piston and to open said valve means for fluid flow into the dashpot cylinder through said high resistance means during retraction of the driving piston, and means operative in response to retraction of the driving piston to a predetermined position to effect the next advance of the driving piston.

PAUL W. ROMINE.
ANDREW ARMSTRONG.

REFERENCES CITED

The following references are of record in the file of this patent:

UNITED STATES PATENTS

| Number | Name | Date |
| --- | --- | --- |
| 651,502 | Fitzgerald | June 12, 1900 |
| 1,969,063 | Ernst et al. | Aug. 7, 1934 |
| 1,978,346 | Ernst et al. | Oct. 23, 1934 |
| 2,079,640 | Vickers et al. | May 11, 1937 |
| 2,178,915 | McKee et al. | Nov. 7, 1939 |